(12) United States Patent
Kawahara et al.

(10) Patent No.: US 9,471,830 B2
(45) Date of Patent: Oct. 18, 2016

(54) COLLATION APPARATUS, COLLATION METHOD, AND COMPUTER PROGRAM PRODUCT

(71) Applicant: KABUSHIKI KAISHA TOSHIBA, Tokyo (JP)

(72) Inventors: Tomokazu Kawahara, Kanagawa (JP); Tatsuo Kozakaya, Kanagawa (JP); Tomoki Watanabe, Kanagawa (JP); Masaki Yamazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 162 days.

(21) Appl. No.: 13/755,520

(22) Filed: Jan. 31, 2013

(65) Prior Publication Data

US 2013/0243271 A1    Sep. 19, 2013

(30) Foreign Application Priority Data

Mar. 14, 2012    (JP) ................ 2012-057590

(51) Int. Cl.
*G06T 17/30* (2006.01)
*G06K 9/46* (2006.01)
*G06K 9/00* (2006.01)

(52) U.S. Cl.
CPC ....... *G06K 9/00275* (2013.01); *G06K 9/00221* (2013.01); *G06K 2009/00328* (2013.01)

(58) Field of Classification Search
None
See application file for complete search history.

(56) References Cited

U.S. PATENT DOCUMENTS

| | | | |
|---|---|---|---|
| 5,901,244 A * | 5/1999 | Souma et al. | 382/190 |
| 6,430,307 B1 * | 8/2002 | Souma et al. | 382/118 |
| 7,317,816 B2 * | 1/2008 | Ray | G06K 9/00281 382/118 |
| 7,734,067 B2 * | 6/2010 | Kim | G06K 9/6255 235/380 |
| 8,027,521 B1 * | 9/2011 | Moon | G06K 9/00288 382/118 |
| 8,599,266 B2 * | 12/2013 | Trivedi | G06K 9/00234 348/143 |

(Continued)

FOREIGN PATENT DOCUMENTS

| JP | 2012-203634 | 10/2002 |
|---|---|---|
| JP | 2006-221479 | 8/2006 |

(Continued)

OTHER PUBLICATIONS

Eshwarappa, M et al. "Multimodal Biometric Person Authentication using Speech, Signature and Handwriting Features" (IJACSA) International Journal of Advanced Computer Science and Applications, Special Issue on Artificial Intelligence (2008) pp. 1-10.*

(Continued)

*Primary Examiner* — Chan Park
*Assistant Examiner* — Mia M Thomas
(74) *Attorney, Agent, or Firm* — Nixon & Vanderhye, P.C.

(57) ABSTRACT

An example collation apparatus includes a user information storage medium and processing circuitry. The processing circuitry is configured to at least receive a captured image including a face of a user and a non-facial object; detect a face region from the image; set an object region corresponding to the location of the non-facial object in the image; extract a face feature vector from the face region and collate the extracted face feature vector with face feature vectors stored in the user information storage medium; extract an object feature vector from the object region and collate the extracted object feature vector with object feature vectors stored in the user information storage medium; and calculate a collation result of the user using at least one of a collation result of face feature vectors and a collation result of object feature vectors.

9 Claims, 7 Drawing Sheets

(56) References Cited

U.S. PATENT DOCUMENTS

| | | | |
|---|---|---|---|
| 8,615,112 B2* | 12/2013 | Takano et al. | 382/118 |
| 9,195,912 B1* | 11/2015 | Huang | G06K 9/00288 |
| 2001/0026634 A1* | 10/2001 | Yamaguchi | G06K 9/00288 |
| | | | 382/118 |
| 2003/0040815 A1* | 2/2003 | Pavlidis | G06F 3/005 |
| | | | 700/48 |
| 2003/0169906 A1* | 9/2003 | Gokturk et al. | 382/115 |
| 2004/0028260 A1* | 2/2004 | Higaki | G06K 9/00335 |
| | | | 382/118 |
| 2004/0183951 A1* | 9/2004 | Lee | 348/652 |
| 2005/0190953 A1* | 9/2005 | Nagahashi | G06K 9/00248 |
| | | | 382/118 |
| 2005/0190963 A1* | 9/2005 | Li | 382/159 |
| 2005/0201595 A1* | 9/2005 | Kamei | G06K 9/00275 |
| | | | 382/118 |
| 2006/0093184 A1* | 5/2006 | Fukui | G06K 9/00234 |
| | | | 382/103 |
| 2006/0204103 A1 | 9/2006 | Mita et al. | |
| 2008/0037837 A1* | 2/2008 | Noguchi et al. | 382/118 |
| 2008/0080745 A1* | 4/2008 | Vanhoucke et al. | 382/118 |
| 2008/0219516 A1* | 9/2008 | Suzuki et al. | 382/118 |
| 2008/0240563 A1* | 10/2008 | Takano et al. | 382/173 |
| 2009/0175509 A1* | 7/2009 | Gonion et al. | 382/118 |
| 2010/0040296 A1* | 2/2010 | Ma | G06K 9/6249 |
| | | | 382/225 |
| 2010/0103286 A1* | 4/2010 | Akiyama | 348/231.6 |
| 2011/0103694 A1* | 5/2011 | Nakano et al. | 382/190 |
| 2011/0122257 A1* | 5/2011 | Kirk | G01C 11/06 |
| | | | 348/187 |
| 2012/0114177 A1* | 5/2012 | Adachi | G06K 9/00362 |
| | | | 382/103 |
| 2012/0230545 A1* | 9/2012 | Zhang et al. | 382/103 |
| 2012/0243779 A1 | 9/2012 | Nakai et al. | |
| 2012/0294535 A1* | 11/2012 | Irmatov et al. | 382/195 |
| 2013/0121584 A1* | 5/2013 | Bourdev et al. | 382/190 |
| 2013/0155063 A1* | 6/2013 | Solem et al. | 345/420 |
| 2013/0227678 A1* | 8/2013 | Kang | G06F 21/32 |
| | | | 726/19 |
| 2014/0003652 A1* | 1/2014 | Fedorovskaya et al. | 382/103 |
| 2014/0056487 A1* | 2/2014 | Suzuki | G06K 9/00892 |
| | | | 382/116 |
| 2014/0078173 A1* | 3/2014 | Takano et al. | 345/629 |
| 2014/0105467 A1* | 4/2014 | Myers et al. | 382/118 |
| 2014/0307063 A1* | 10/2014 | Lee | G06T 7/2046 |
| | | | 348/51 |
| 2015/0086086 A1* | 3/2015 | Myers | G06K 9/00288 |
| | | | 382/118 |

FOREIGN PATENT DOCUMENTS

| | | | | |
|---|---|---|---|---|
| JP | 2006-268825 | | 10/2006 | |
| JP | 2007-199860 | | 8/2007 | |
| JP | 2010086263 | | 4/2010 | |
| JP | 2010-251280 | * | 9/2010 | G06K 9/00 |
| JP | 2004157923 | | 6/2014 | |

OTHER PUBLICATIONS

El-Khoury et al. "Face-and-Clothing Based People Clustering in Video Content" MIR'10, Mar. 29-31, 2010, Philadelphia, Pennsylvania, USA. Copyright 2010 ACM , pp. 295-304.*

Lowe et al. "Distinctive Image Features from Scale-Invariant Keypoints", International Journal of Computer Vision, 2004, pp. 1-28.*

Office Action mailed Apr. 15, 2014 in counterpart Japanese Patent Application No. 2012-057590 and English-language translation thereof.

Makai et al., U.S. Appl. No. 13/420,833, filed Mar. 15, 2012.

* cited by examiner

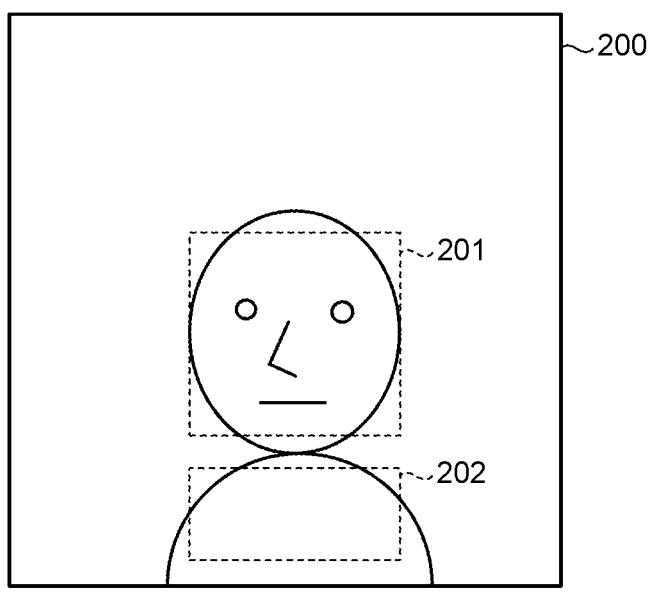

| ID | FACE FEATURE VECTOR | OBJECT FEATURE VECTOR | OBJECT REGION |
|---|---|---|---|
| 001 | $(a_1, a_2, a_3, \cdots, a_N)$ | $(A_1, A_2, A_3, \cdots, A_M)$ | TYPE 1 |
| 002 | $(b_1, b_2, b_3, \cdots, b_N)$ | $(B_1, B_2, B_3, \cdots, B_M)$ | TYPE 2 |
| ⋮ | ⋮ | ⋮ | ⋮ |

COLLATION APPARATUS, COLLATION METHOD, AND COMPUTER PROGRAM PRODUCT

CROSS-REFERENCE TO RELATED APPLICATION

This application is based upon and claims the benefit of priority from Japanese Patent Application No. 2012-057590, filed on Mar. 14, 2012; the entire contents of which are incorporated herein by reference.

FIELD

Embodiments described herein relate generally to a collation apparatus, a collation method, and a computer program product.

BACKGROUND

Conventionally, in order to improve security in user collation, a technology of using collation different from face collation in addition to the face collation has been known.

In the above-described conventional technology, when object collation is used in collation different from face collation, it is generally difficult to automatically recognize an object to be collated in the object collation. Therefore, since a user is required to specify the position of an object to be collated, there is a problem that convenience is insufficient.

BRIEF DESCRIPTION OF THE DRAWINGS

FIG. 2 is a diagram illustrating an example of an object region according to the embodiment;

FIG. 3 is a diagram illustrating an example of information stored in a user information storage unit according to the embodiment;

DETAILED DESCRIPTION

According to an embodiment, a collation apparatus includes a receiving unit, a detecting unit, a setting unit, a user information storage unit, a face collation unit, an object collation unit, and a calculating unit. The receiving unit is configured to receive a captured image including a face of a user and an object positioned at a location determined by a relation with the face. The detecting unit is configured to detect a face region from the image. The setting unit is configured to set an object region corresponding to the location in the image. The object region is determined by a relation with the face region. The user information storage unit is configured to store identification information for identifying the user corresponding to a face feature vector of the face of the user and an object feature vector of the object used to collate the user. The face collation unit is configured to extract a face feature vector from the face region and collate the extracted face feature vector with the face feature vector stored in the user information storage unit. The object collation unit is configured to extract an object feature vector from the object region and collate the extracted object feature vector with the object feature vector stored in the user information storage unit. The calculating unit is configured to calculate a collation result of the user using at least one of a collation result of the face feature vectors and a collation result of the object feature vectors.

Hereinafter, embodiments will be described in detail with reference to the accompanying drawings.

Figure 1:
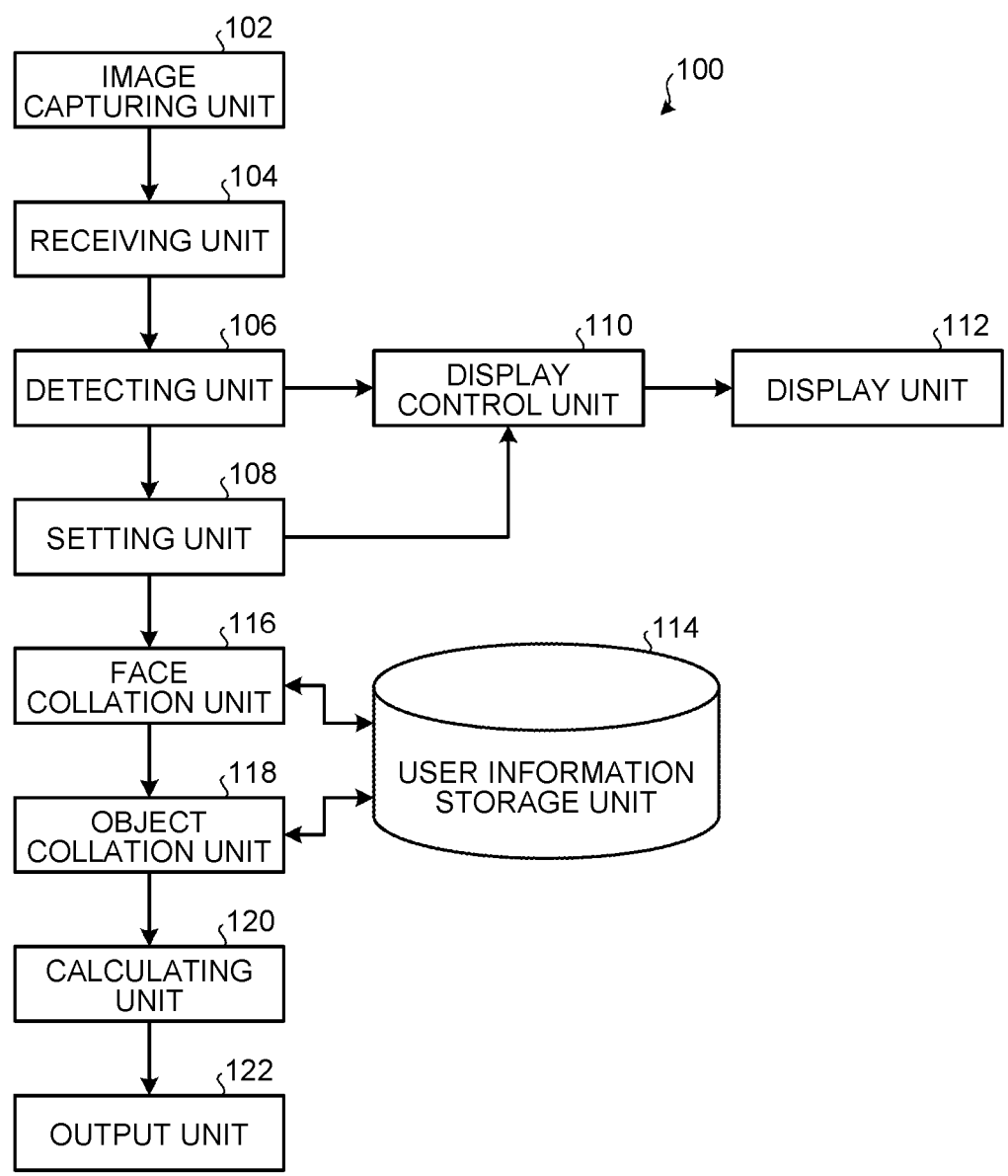
FIG. 1 is a diagram illustrating an example of the configuration of a collation apparatus according to an embodiment.

FIG. 1 is a diagram illustrating an example of the configuration of a collation apparatus 100 according to the embodiment. As illustrated in FIG. 1, a collation apparatus 100 includes an image capturing unit 102, a receiving unit 104, a detecting unit 106, a setting unit 108, a display control unit 110, a display unit 112, a user information storage unit 114, a face collation unit 116, an object collation unit 118, a calculating unit 120, and an output unit 122.

For example, the image capturing unit 102 can be realized by an imaging device such as a camera. The receiving unit 104, the detecting unit 106, the setting unit 108, the display control unit 110, the face collation unit 116, the object collation unit 118, and the calculating unit 120 can be realized by causing a processing device such as a central processing unit (CPU) to execute a program, that is, by software, can be realized by hardware such as an integrated circuit (IC), or can be realized by both software and hardware. For example, the display unit 112 can be realized by a display device such as a liquid crystal display. The user information storage unit 114 can be realized by at least one storage device capable of storing data magnetically, optically, and electrically, such as a hard disk drive (HDD), a solid state drive (SSD), and a read-only memory (ROM), and a memory card. For example, the output unit 122 can be realized by an interface or the like for outputting data.

The image capturing unit 102 sequentially captures images and inputs the captured images to the receiving unit 104. In this embodiment, it is assumed that the image capturing unit 102 captures images of a user to be collated. Specifically, it is assumed that the image capturing unit 102 captures an image of the face of a user, and then captures an image of an object positioned at a location determined by the face of the user and a relation with the face. The location determined by the relation with the face of the user will be described later. The object is to be used in user collation. Any object may be used, as long as the object is an object, such as an ID card, owned by a user.

The receiving unit 104 sequentially receives input of the images captured by the image capturing unit 102. Specifically, the receiving unit 104 receives input of captured images each including the face of the user or including the face of the user and an object positioned at a location determined by a relation with the face.

The detecting unit 106 detects a face region which is a region of the face of the user from the image received by the receiving unit 104. Specifically, the detecting unit 106 detects a face region from the image received by the receiving unit 104 in accordance with a method disclosed in JP-A 2006-268825 (KOKAI). However, the method of detecting a face region is not limited thereto. For example, the detecting unit 106 may perform template matching with the image received by the receiving unit 104 using, for example, one or more face images and may set a region that exceeds a predetermined threshold value among regions of the image received by the receiving unit 104 as a face region.

In this embodiment, a face region is assumed to be a rectangular region that is expressed by a pair of the coordinates $(x_1, y_1)$ of the upper left point of the rectangular region and the coordinates $(x_2, y_2)$ of the lower right point of the rectangular region. Here, it is assumed that the horizontal direction of an image is the x axis and the vertical direction of the image is the y axis. However, the face region is not limited thereto. For example, the face region may be set as a circular region and may be expressed by the coordinates of the central point and the length of the radius of the circular region. The face region may be set as an elliptical region and may be expressed by the central point of the elliptical region and the coordinates of the major and minor axes of the elliptical region. The face region may be set as a polygonal region and may be expressed by the coordinates of vertexes of the polygonal region.

When the detecting unit 106 may not detect a face region from the image received by the receiving unit 104, the detecting unit 106 instructs the display control unit 110 to display the image.

The setting unit 108 sets an object region, which is a region determined by the relation with the face region detected by the detecting unit 106 and is a region corresponding to a location determined by the relation with the face of the user, as an image in which the face region is detected by the detecting unit 106. Specifically, the setting unit 108 determines the object region based on the position and size of the face region detected by the detecting unit 106 and sets the determined object region as an image in which the face region is detected by the detecting unit 106.

In this embodiment, as in the face region, the object region is a rectangular region and is expressed by a pair of the coordinates $(x_1', y_1')$ of the upper left point of the rectangular region and the coordinates $(x_2', y_2')$ of the lower right point of the rectangular region. The coordinates $x_1'$, $y_1'$, $x_2'$, and $y_2'$ can be expressed by linear expressions of the coordinates $(x_1, y_1)$ of the upper left point and the coordinates $(x_2, y_2)$ of the lower right point of the face region, as in Equation (1) to Equation (4).

$$x_1' = ax_1 + by_1 + cx_2 + dy_2 + e \quad (1)$$

$$y_1' = fx_1 + gy_1 + hx_2 + iy_2 + j \quad (2)$$

$$x_2' = kx_1 + ly_1 + mx_2 + ny_2 + o \quad (3)$$

$$y_2' = px_1 + qy_1 + rx_2 + sy_2 + t \quad (4)$$

In the equations, a to t are coefficients.

FIG. 2 is a diagram illustrating an example of an object region according to this embodiment. In the example illustrated in FIG. 2, an object region 202 is set below a face region 201 in an image 200.

The setting unit 108 instructs the display control unit 110 to display an image in which the object region is set.

The display control unit 110 sequentially displays images input from the image capturing unit 102 on the display unit 112. Specifically, when the display control unit 110 receives the instruction to display the image from the detecting unit 106 or the setting unit 108, the display control unit 110 displays the specified image on the display unit 112.

Thus, when the face region is detected by the detecting unit 106, an image including the face of the user and the object region is displayed on the display unit 112. Therefore, the user is urged to understand that the location is to be determined by the relation with the face of the user and is a location at which an object to be collated is present, and the user is also prompted to position the object to be collated at the location. Accordingly, the object region is to be determined by the relation with the face region and is a region corresponding to the location determined by the relation with the face of the user.

The user information storage unit 114 stores identification information for identifying a user, a face feature vector of the face of the user, and an object feature vector of an object to be used to collate the user in association with one another.

FIG. 3 is a diagram illustrating an example of information stored in the user information storage unit 114 according to this embodiment. In the example illustrated in FIG. 3, the user information storage unit 114 stores a table in which the face feature vector and the object feature vector of the user are matched for each ID of users. Here, the face feature vector and the object feature vector are feature vectors extracted in advance from the face and the object of the user, respectively. In this embodiment, the face feature vector is a value obtained by normalizing, to 1, a vector in which the luminance values of regions that form a face image are arranged. The object feature vector is an amount obtained by normalizing, to 1, a vector in which the luminance values of regions that form an object image are arranged, but not limited thereto.

The face collation unit 116 extracts the face feature vector from the face region detected by the detecting unit 106 and collates the extracted face feature vector with the face feature vector stored in the user information storage unit 114.

Figure 4:
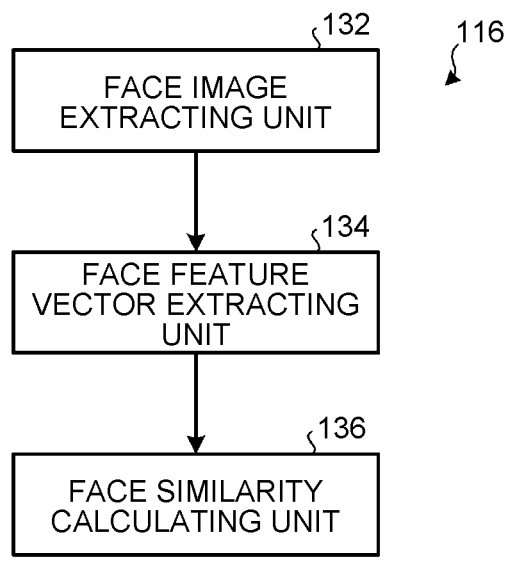
FIG. 4 is a diagram illustrating an example of the configuration of a face collation unit according to the embodiment.

FIG. 4 is a diagram illustrating an example of the configuration of the face collation unit 116 according to this embodiment. As illustrated in FIG. 4, the face collation unit 116 includes a face image extracting unit 132, a face feature vector extracting unit 134, and a face similarity calculating unit 136.

The face image extracting unit 132 extracts a face region detected by the detecting unit 106 from an image in which an object region is set by the setting unit 108 and sets the extracted face region as a face image. Specifically, the face region is a rectangular region, the coordinates of the upper left point of the rectangular region are $(x_1, y_1)$, and the coordinates of the lower right point of the rectangular region are $(x_2, y_2)$. Therefore, the face image extracting unit 132 extracts a face image having four vertexes of $(x_1, y_1)$, $(x_2, y_1)$, $(x_1, y_2)$, and $(x_2, y_2)$ from an image in which the object region is set by the setting unit 108. Further, the face image extracting unit 132 may detect feature points of the face from an image in which the object region is set by the setting unit 108 using the face region detected by the detecting unit 106 and may set an image obtained through normalization using the detected feature points as a face image.

The face feature vector extracting unit 134 extracts a face feature vector which is a feature vector of the face image extracted by the face image extracting unit 132. In this embodiment, the face feature vector extracting unit 134 sets a result obtained by normalizing a vector, in which the luminance values of regions that form the face image are arranged, to 1 as the face feature vector, but not limited thereto. The face feature vector extracting unit 134 may set, as the face feature vector, a vector in which the luminance values of regions that form an image obtained by applying a Sobel filer or a Gabor filter to the face image are arranged. Further, the face feature vector extracting unit 134 may set, as the face feature vector, a result obtained by performing linear transformation such as whitening transformation on the above-described vector.

The face similarity calculating unit 136 calculates face similarity which is the degree of similarity between the face feature vector extracted by the face feature vector extracting unit 134 and each face feature vector stored in the user information storage unit 114. In this embodiment, the face similarity takes the values of 0 to 1. As the face similarity is closer to 1, both the face feature vectors are closer to each other. However, the invention is not limited thereto. For example, the face similarity calculating unit 136 calculates the inner product of the face feature vectors using Equation (5), as the face similarity. In this embodiment, since either face feature vector is the vector with the length of 1, the inner product of the face feature vectors becomes simple similarity.

$$\text{Face Similarity} = s_1 t_1 + s_2 t_2 + \ldots + s_N t_N \quad (5)$$

In this expression, $s_1, \ldots, s_N$ indicate the face feature vector extracted by the face feature vector extracting unit 134 and $t_1, \ldots, t_N$ indicate the face feature vector stored in the user information storage unit 114. Here, N is an integer equal to or greater than 2.

However, the face similarity is not limited to the inner product of the vector, but may be the length of vector.

The object collation unit 118 extracts an object feature vector from the object region set by the setting unit 108 and collates the extracted object feature vector with the object feature vector stored in the user information storage unit 114.

Figure 5:
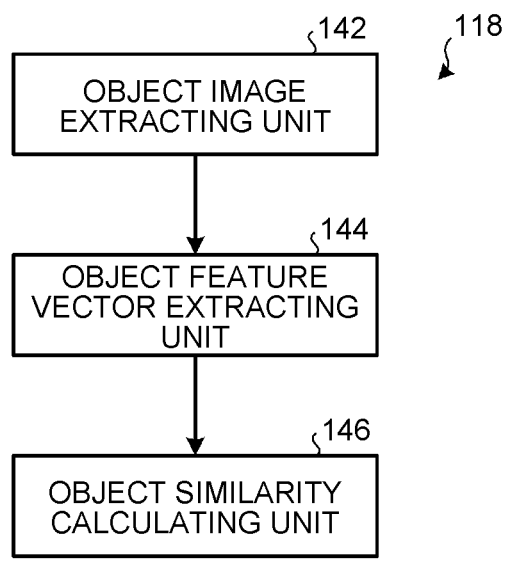
FIG. 5 is a diagram illustrating an example of an object collation unit according to the embodiment.

FIG. 5 is a diagram illustrating an example of the configuration of the object collation unit 118 according to this embodiment. As illustrated in FIG. 5, the object collation unit 118 includes an object image extracting unit 142, an object feature vector extracting unit 144, and an object similarity calculating unit 146.

The object image extracting unit 142 extracts an object region from an image in which the object region is set by the setting unit 108, and sets the extracted object region as an object image. Specifically, the object region is a rectangular region, the coordinates of the upper left point of the rectangular region are $(x_1', y_1')$, and the coordinates of the lower right point of the rectangular region are $(x_2', y_2')$. Therefore, the object image extracting unit 142 extracts an object image having four vertexes of $(x_1', y_1')$, $(x_2', y_1')$, $(x_1', y_2')$, and $(x_2', y_2')$ from an image in which the object region is set by the setting unit 108.

The object image extracting unit 142 may extract a plurality of object images from the object region. For example, the object image extracting unit 142 may divide the object region into a plurality of regions with a width w (where $0 < w < x_2' - x_1'$) and a height h (where $0 < h < y_2' - y_1'$) and may extract each of the divided regions as an object image.

The object feature vector extracting unit 144 extracts an object feature vector which is a feature vector of the object image extracted by the object image extracting unit 142. In this embodiment, the object feature vector extracting unit 144 sets a result obtained by normalizing a vector, in which the luminance values of regions that form the object image are arranged, to 1 as the object feature vector, but not limited thereto. The object feature vector extracting unit 144 may set, as the object feature vector, a vector in which the luminance values of regions that form an image obtained by applying a Sobel filer or a Gabor filter to the object image are arranged. Further, the object feature vector extracting unit 144 may set, as the object feature vector, a result obtained by performing linear transformation such as whitening transformation or the like to the above-described vector. Further, when the plurality of object images are extracted by the object image extracting unit 142, the object feature vector extracting unit 144 extracts the object feature vector from each of the object images.

The object similarity calculating unit 146 calculates object similarity, which is the degree of similarity between the object feature vector extracted by the object feature vector extracting unit 144 and the object feature vector stored in the user information storage unit 114. In this embodiment, the object similarity takes the values of 0 to 1. As the object similarity is closer to 1, both the object feature vectors are closer to each other. However, the object feature vector is not limited thereto. For example, the object similarity calculating unit 146 calculates the inner product of the object feature vectors using Equation (6) as the object similarity. In this embodiment, since either object feature vector is the vector with the length of 1, the inner product of the object feature vectors becomes simple similarity.

$$\text{Object Similarity} = u_1 v_1 + u_2 v_2 + \ldots + u_M v_M \quad (6)$$

In this expression, $u_1, \ldots, u_M$ indicate the object feature vector extracted by the object feature vector extracting unit 144 and $v_1, \ldots, v_M$ indicate the object feature vector stored in the user information storage unit 114. Here, M is an integer equal to or greater than 2.

However, the object similarity is not limited to the inner product of the vector, but the length of vector may be used.

The calculating unit 120 calculates a collation result of the user using at least one of the collation result of the face feature vector and the collation result of the object feature vector. Specifically, since the face similarity and the object similarity are calculated for each ID of the user by the face collation unit 116 and the object collation unit 118, respectively, the calculating unit 120 calculates a sum or an average of the face similarity and the object similarity for which the ID is identical as user similarity which is the degree of similarity of the user. However, the calculating unit 120 may set the similarity with the larger value between the face similarity and the object similarity for which the ID is identical as the user similarity. The calculating unit 120 determines the user similarity with the largest value and the ID as a collation result of the user. However, the calculating unit 120 may set a threshold value in advance and may determine the user similarity equal to or greater than the threshold value and the ID as the collation result of the user. In this case, when the user similarity equal to or greater than the threshold value is not present, the collation result fails. Further, the calculating unit 120 may determine all of the user similarities and the IDs as the collation result of the user.

The output unit 122 outputs the collation result of the user calculated by the calculating unit 120.

Figure 6:
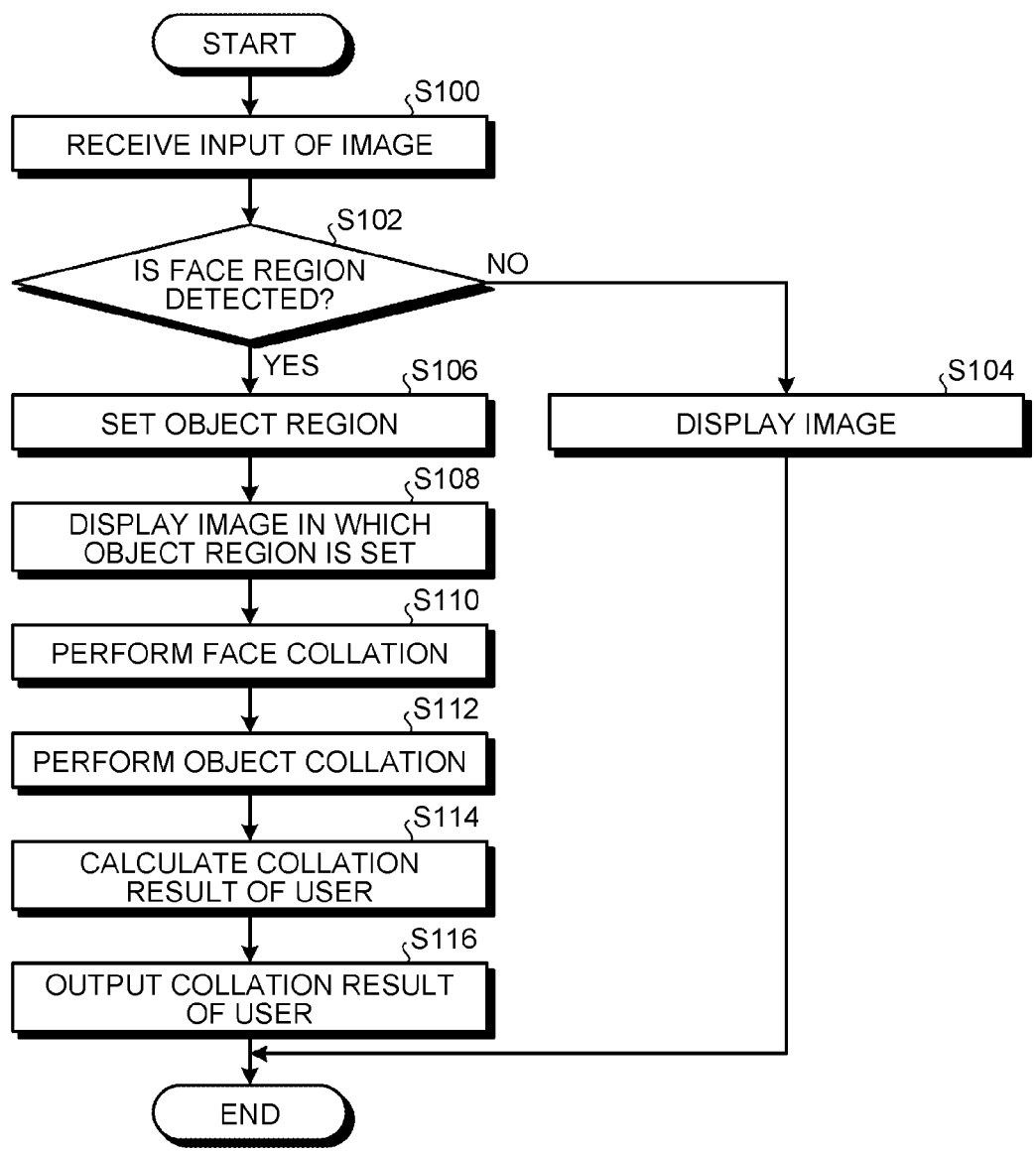
FIG. 6 is a flowchart illustrating an example of a collation process according to the embodiment.

FIG. 6 is a flowchart illustrating an example of the flow of an order of the collation process performed by the collation apparatus 100 according to this embodiment. The process described in the flowchart of FIG. 6 is performed whenever an image is input from the image capturing unit 102.

First, the receiving unit 104 receives input of the image captured by the image capturing unit 102 (step S100).

Next, the detecting unit 106 detects a face region from the image received by the receiving unit 104 (step S102).

When the detecting unit 106 may not detect the face region from the image (No in step S102), the display control unit 110 displays the image on the display unit 112 (step S104).

Conversely, when the detecting unit 106 detects the face region from the image (Yes in step S102), the setting unit 108 sets an object region in the image from which the face region is detected by the detecting unit 106 (step S106).

Next, the display control unit 110 displays the image in which the object region is set by the setting unit 108 on the display unit 112 (step S108).

Next, the face collation unit 116 extracts the face feature vector from the face region detected by the detecting unit 106 and collates the extracted face feature vector with the face feature vector stored in the user information storage unit 114 (step S110).

Next, the object collation unit 118 extracts the object feature vector from the object region set by the setting unit 108 and collates the extracted object feature vector with the object feature vector stored in the user information storage unit 114 (step S112).

Next, the calculating unit 120 calculates a collation result of the user using at least one of the collation result of the face feature vector and the collation result of the object feature vector (step S114).

Next, the output unit 122 outputs the collation result of the user calculated by the calculating unit 120 (step S116).

Figure 7:
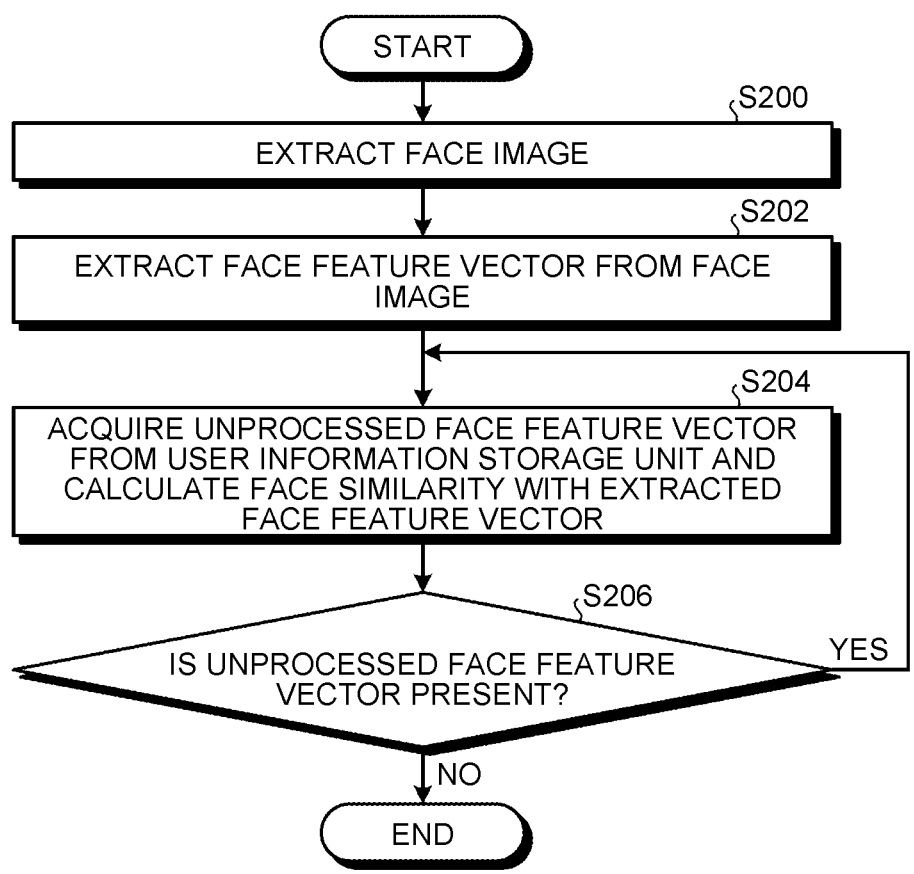
FIG. 7 is a flowchart illustrating an example of a face collation process according to the embodiment.

FIG. 7 is a flowchart illustrating an example of the flow of an order of the face collation process in step S110 of the flowchart of FIG. 6.

First, the face image extracting unit 132 extracts the face region detected by the detecting unit 106 from the image in which the object region is set by the setting unit 108 and sets the extracted face region as a face image (step S200).

Next, the face feature vector extracting unit 134 extracts a face feature vector of the face image extracted by the face image extracting unit 132 (step S202).

Next, the face similarity calculating unit 136 acquires an unprocessed face feature vector from the user information storage unit 114 and calculates face similarity with face feature vector extracted by the face feature vector extracting unit 134 (step S204).

Next, when an unprocessed face feature vector remains in the user information storage unit 114 (Yes in step S206), the face similarity calculating unit 136 causes the process to return to step S204. When all of the face feature vectors stored in the user information storage unit 114 are processed (No in step S206), the face collation process ends.

Figures 8, 9:
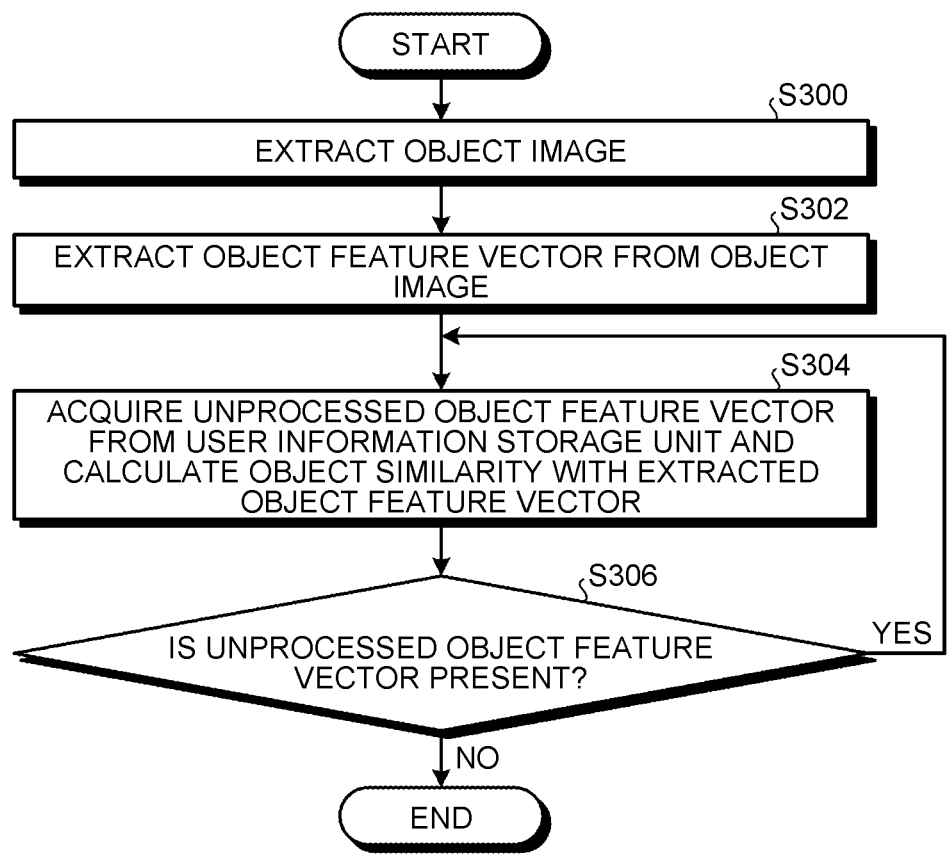
FIG. 8 is a flowchart illustrating an example of an object collation process according to the embodiment.
FIG. 9 is a diagram illustrating information stored in the user information storage unit according to a modified example.

FIG. 8 is a flowchart illustrating an example of the flow of an order of the object collation process in step S112 of the flowchart of FIG. 6.

First, the object image extracting unit 142 extracts the object region from the image in which the object region is set by the setting unit 108 and sets the extracted object region as an object image (step S300).

Next, the object feature vector extracting unit 144 extracts an object feature vector of the object image extracted by the object image extracting unit 142 (step S302).

Next, the object similarity calculating unit 146 acquires an unprocessed object feature vector from the user information storage unit 114 and calculates object similarity with the object feature vector extracted by the object feature vector extracting unit 144 (step S304).

Next, when an unprocessed object feature vector remains in the user information storage unit 114 (Yes in step S306), the object similarity calculating unit 146 causes the process to return to step S304. When all of the object feature vectors stored in the user information storage unit 114 are processed (No in step S306), the object collation process ends.

Thus, in this embodiment, an object region on which the object collation process is to be performed using a face region is set in an image, the face collation process is performed on the face region, and the object collation process is performed on the object region. According to this embodiment, since the object collation process can be performed without causing a user to instruct the position of an object to be collated, security and convenience can be improved in the user collation process.

Further, according to this embodiment, since an image in which an object region is set is displayed, even a user who does not know the location of an object to be collated can understand the location and can be also prompted to position the object to be collated at the location.

First Modified Example

In the above-described embodiment, the example has been described in which the object collation unit 118 collates the object feature vector extracted from the object region with all of the object feature vectors stored in the user information storage unit 114. However, the object feature vector may be collated with some of the object feature vectors stored in the user information storage unit 114. Thus, the time necessary for the user collation can be shortened.

For example, the object collation unit 118 may collate the object feature vector extracted from the object region with the object feature vector, for which the collation result obtained by the face collation unit 116 corresponds to the high-order predetermined number of face feature vectors, among the object feature vectors stored in the user information storage unit 114.

Further, for example, the object collation unit 118 may collate the object feature vector extracted from the object region with the object feature vector, for which the collation result obtained by the face collation unit 116 corresponds to the face feature vector with a value equal to or greater than a threshold value, among the object feature vectors stored in the user information storage unit 114.

In this case, the calculating unit 120 sets, to 0, user similarity of an ID for which the object feature vector is not calculated.

Second Modified Example

The face collation unit 116 (the face feature vector extracting unit 134) may extract the face feature vector in accordance with a method different from the method described above in the embodiment. For example, the face collation unit 116 may extract the face feature vector in accordance with the method disclosed in JP-A 2006-221479 (KOKAI).

Third Modified Example

In the above-described embodiment, the example has been described in which the object feature vector is the vector that expresses the luminance values. However, the object feature vector may be an image-feature expressing vector which is at least one of the vectors based on co-occurrence frequency of a luminance gradient direction, a co-occurrence frequency of a color change in a direction perpendicular to an edge direction in an edge, and a color frequency.

Fourth Modified Example

In the above-described embodiment, the example has been described in which the setting unit 108 sets one object region in the image in which the face region is detected by the detecting unit 106. However, a plurality of object regions may be set. In the example illustrated in FIG. 2, for example, the setting unit 108 sets the object region located below the face region, but may set the object region at least at one of the upper, lower, right, and left sides of the face region.

Further, the setting unit 108 may set an object region present within an image among a plurality of object regions as an image. For example, the setting unit 108 sets a priority in the plurality of object regions, determines whether the object region is present within the image in the order of the higher priority, and sets the object region as an image when the object region is present within the image. The setting unit 108 may end the process when setting the object region as the image or may continue the process until determining whether or not all of the object regions are present within the image. Further, when the object region is not set as the image, the collation process is not performed and a collation failure is output as the collation result of the user from the output unit 122. In some cases, the capturing unit 102 is located above the level of User's height, or the capturing unit 102 has a narrow angle of view. Even if the user's face includes in the image, the predetermined object region does not include in the image. So the setting unit 108 need to determines whether the object region is included in the image that the capturing unit 102 is captured.

The object collation unit 118 extracts the object feature vector from each of the plurality of object regions set as the images and collates each of the plurality of extracted object feature vectors with each of object feature vectors stored in the user information storage unit 114. Then, the object collation unit 118 uses the highest object similarity among the plurality of object similarities obtained through the collation process as the object similarity with these object feature vectors.

For example, as illustrated in FIG. 9, types of object regions may be added to the table stored in the user information storage unit 114. The object collation unit 118 may collate the object feature vector extracted from the object region indicated by the type of object region among the plurality of the object regions with each of the object feature vectors stored in the user information storage unit 114. In the example illustrated in FIG. 9, for example, TYPE 1 indicates an object region located below a face region and TYPE 2 indicates an object region located on the right of the face region.

Fifth Modified Example

In the above-described embodiment, the example has been described in which the face collation unit 116 performs the face collation process, and then the object collation unit 118 performs the object collation process. However, the collation order is not limited thereto. The object collation unit 118 may perform the object collation process, and then the face collation unit 116 may perform the face collation process. Further, the face collation process of the face collation unit 116 and the object collation process of the object collation unit 118 may be performed in parallel.

Hardware Configuration

Figure 10:
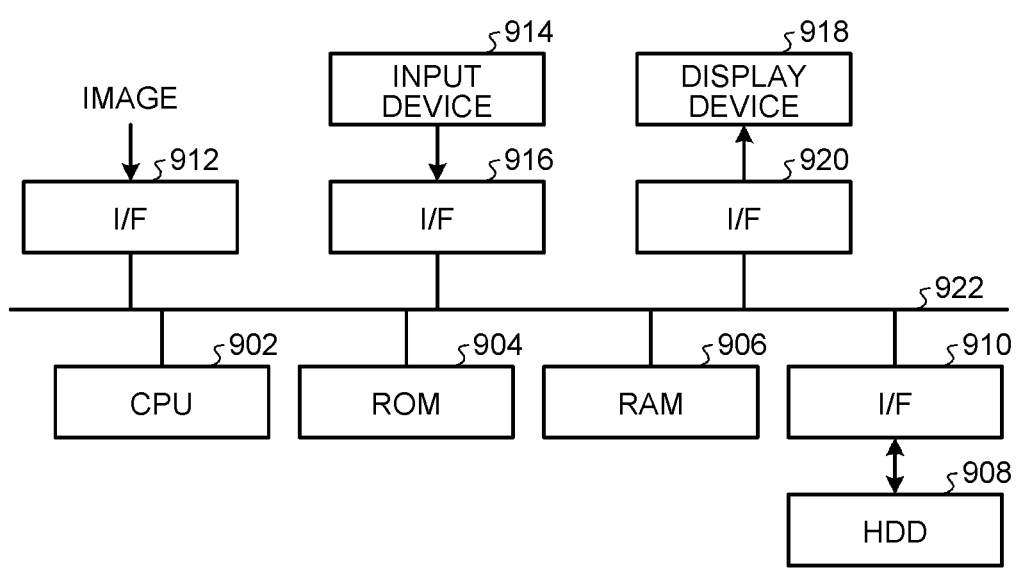
FIG. 10 is a diagram illustrating an example of a hardware configuration of a collation apparatus according to the embodiment and each modified example.

FIG. 10 is a block diagram illustrating an example of a hardware configuration of the collation apparatus 100 according to the embodiment and the modified examples described above. As illustrated in FIG. 10, the collation apparatus 100 according to the embodiment and the modified examples described above includes a CPU 902, a ROM 904 that stores a collation program or the like to be executed to collate a face and an object, a RAM 906, an HDD 908 that stores user information or the like, an I/F 910 which is an interface with the HDD 908, an I/F 912 which is an interface for inputting an image, and an input device 914 such as a mouse or a keyboard, an I/F 916 which is an interface with the input device 914, a display device 918 such as a display, an I/F 920 which is an interface with the display device 918, and a bus 922. Thus, the collation apparatus 100 has a computer hardware configuration. Further, the CPU 902, the ROM 904, the RAM 906, the I/F 910, the I/F 912, the I/F 916, and the I/F 920 are connected to each other via the bus 922.

In the collation apparatus 100 according to the embodiment and the modified examples described above, the CPU 902 reads the collation program from the ROM 904 and executes the read collation program on the RAM 906 to realize each unit on a computer. Further, in the collation apparatus 100 according to the embodiment and the modified examples described above, the CPU 902 collates a face and an object included in an image input from the I/F 912 based on the user information or the like stored in the HDD 908.

Further, the collation program may be stored in the HDD 908. The collation program may be also stored in the form of a file with an installable format or an executable format in a computer-readable recording medium such as a CD-ROM, a CD-R, a memory card, a DVD, or a flexible disk (FD) so as to be provided as a computer program product. The collation program may be also stored in a computer connected to a network such as the Internet and may be provided in a download manner via the network. The collation program may be also provided or distributed via a network such as the Internet. The user information may be stored in the ROM 904.

For example, the processing order in the steps of the flowchart described above in the embodiment may be changed, unless the changed processing order contradicts to the nature of the steps. Further, the plurality of steps may be simultaneously performed or may be performed in different orders whenever the steps are performed.

Thus, according to the embodiment and the modified examples described above, it is possible to improve the security and convenience in the user collation process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A collation apparatus comprising:
   a user information storage medium configured to store
     user identification information relating to respective face feature vectors of faces of each of one or more users and corresponding object feature vectors; and processing circuitry configured to at least:

receive a captured image including a face of a user and a non-facial object positioned in the image at a location different from a location of the face;

detect a face region from the image;

set an object region corresponding to the location of the non-facial object in the image;

extract a face feature vector from the face region and collate the extracted face feature vector with face feature vectors stored in the user information storage medium;

extract, from the object region corresponding to the location of the non-facial object, a plurality of images smaller than the object region, extract an object feature vector from each of the extracted images, and collate each extracted object feature vector with object feature vectors stored in the user information storage medium, wherein each object feature vector comprises an image-feature expressing a vector of the image capturing the non-facial object; and calculate a collation result of the user using one or both of a collation result of face feature vectors and a collation result of object feature vectors.

2. The apparatus according to claim 1, wherein the processing circuitry is further configured to display the image in which the object region is set, on a display.

3. The apparatus according to claim 1, wherein the processing circuitry is further configured to determine the object region based on a position and a size of the face region and set the determined object region in the image.

4. The apparatus according to claim 1, wherein the processing circuitry is further configured to collate each extracted object feature vector with object feature vectors for which the collation results correspond to a high-order predetermined number of face feature vectors among the object feature vectors stored in the user information storage medium.

5. The apparatus according to claim 1, wherein the processing circuitry is further configured to collate each extracted object feature vector with object feature vectors for which the collation results correspond to the face feature vector equal to or greater than a threshold value among the object feature vectors stored in the user information storage medium.

6. The apparatus according to claim 1, wherein the processing circuitry is further configured to determine a plurality of object regions each corresponding to a location of a respective non-facial object and set the object regions in the image, and extract object feature vectors from the respective object regions set in the image and collate each extracted object feature vector with the object feature vectors stored in the user information storage medium.

7. The apparatus according to claim 6, wherein the processing circuitry is further configured to set the object region within the image among the object regions.

8. A collation method comprising:

receiving a captured image including a face of a user and a non-facial object positioned in the image at a location different from a location of the face;

detecting a face region from the image;

setting an object region corresponding to the location of the non-facial object in the image;

extracting a face feature vector from the face region;

collating the extracted face feature vector with face feature vectors stored in a user information storage medium that stores user identification information relating to respective face feature vectors of faces of each of one or more users and corresponding object feature vectors;

extracting, from the object region corresponding to the location of the non-facial object, a plurality of images smaller than the object region, and extracting an object feature vector from each of the extracted images, wherein each object feature vector comprises an image-feature expressing a vector of the image capturing the non-facial object;

collating each extracted object feature vector with object feature vectors stored in the user information storage medium; and calculating a collation result of the user using one or both of a collation result of face feature vectors and a collation result of object feature vectors.

9. A computer program product comprising a non-transitory computer-readable storage medium containing a program which, when executed by a computer, causes the computer to execute at least:

receiving a captured image including a face of a user and a non-facial object positioned in the image at a location different from a location of the face;

detecting a face region from the image;

setting an object region corresponding to the location of the non-facial object in the image;

extracting a face feature vector from the face region;

collating the extracted face feature vector with face feature vectors stored in a user information storage medium that stores user identification information relating to respective face feature vectors of faces of one or more users and corresponding object feature vectors;

extracting, from the object region corresponding to the location of the non-facial object, a plurality of images smaller than the object region, and extracting an object feature vector from each of the extracted images, wherein each object feature vector comprises an image-feature expressing a vector of the image capturing the non-facial object;

collating each extracted object feature vector with object feature vectors stored in the user information storage medium; and calculating a collation result of the user using one or both of a collation result of face feature vectors and a collation result of object feature vectors.

* * * * *